US007248838B2

United States Patent
Goodnow et al.

(10) Patent No.: US 7,248,838 B2
(45) Date of Patent: *Jul. 24, 2007

(54) WIRELESS COMMUNICATION SYSTEM WITHIN A SYSTEM ON A CHIP

(75) Inventors: Kenneth J. Goodnow, Essex Junction, VT (US); Riyon W. Harding, Richmond, VT (US); Charles J. Masenas, Essex Junction, VT (US); Jason M. Norman, South Burlington, VT (US); Sebastian T. Ventrone, South Burlington, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/410,829

(22) Filed: Apr. 24, 2006

(65) Prior Publication Data

US 2006/0189294 A1    Aug. 24, 2006

Related U.S. Application Data

(63) Continuation of application No. 10/249,568, filed on Apr. 19, 2003.

(51) Int. Cl.
*H04B 1/00* (2006.01)
*H04B 7/00* (2006.01)

(52) U.S. Cl. .......... 455/70; 455/67.14; 455/226.1; 455/180.3; 455/193.2; 455/193.3; 455/41.2; 385/89; 714/28; 714/724; 714/726

(58) Field of Classification Search .......... 455/41.2, 455/67.14, 70, 180.3, 193.2, 193.3, 226.1; 714/28, 724; 385/89
See application file for complete search history.

(56) References Cited

U.S. PATENT DOCUMENTS

| 4,937,586 | A |   | 6/1990  | Stevens et al. ............ 343/702 |
|-----------|---|---|---------|-------------------------------------|
| 5,438,699 | A |   | 8/1995  | Coveley .................. 455/67.14 |
| 5,502,374 | A |   | 3/1996  | Cota ........................ 324/127 |
| 5,668,809 | A |   | 9/1997  | Rostoker et al. ........... 370/392 |
| 5,793,759 | A |   | 8/1998  | Rakib et al. ................ 370/342 |
| 5,864,550 | A |   | 1/1999  | Posti ......................... 370/338 |
| 6,145,016 | A | * | 11/2000 | Lai et al. ...................... 710/4 |
| 6,169,912 | B1 |  | 1/2001  | Zuckerman ................. 455/570 |
| 6,182,165 | B1 | * | 1/2001 | Spilo .......................... 710/22 |
| 6,249,889 | B1 | * | 6/2001 | Rajsuman et al. .......... 714/718 |
| 6,249,893 | B1 | * | 6/2001 | Rajsuman et al. .......... 714/741 |
| 6,542,754 | B1 | * | 4/2003 | Sayers et al. ............... 455/502 |
| 6,560,712 | B1 | * | 5/2003 | Arends et al. ............. 713/320 |
| 6,578,155 | B1 | * | 6/2003 | Faucher et al. ............ 713/501 |
| 6,675,284 | B1 | * | 1/2004 | Warren ........................ 712/38 |

(Continued)

*Primary Examiner*—Marceau Milord
(74) *Attorney, Agent, or Firm*—Downs Rachlin Martin PLLC

(57) ABSTRACT

A communication system for transmitting data between cores embedded in an integrated circuit on a silicon chip. Communication system includes transmitter circuitry for wirelessly transmitting data between cores and receiver circuitry for wirelessly receiving the transmission of data from other cores. Both transmitter circuitry and receiver circuitry may include of a phase-locked loop circuit having a voltage-controlled oscillator. Each core may transmit and receive data on a unique frequency with respect to other cores embedded in an integrated circuit on a silicon chip or transmit and receive data on the same frequency as other cores embedded in an integrated circuit on a silicon chip. Groups of cores may share transmitter and receiver circuitry.

17 Claims, 10 Drawing Sheets

U.S. PATENT DOCUMENTS

| | | | |
|---|---|---|---|
| 6,714,553 B1 * | 3/2004 | Poole et al. | 370/412 |
| 6,748,479 B2 * | 6/2004 | Sano et al. | 710/316 |
| 6,862,397 B2 | 3/2005 | Harres et al. | 385/147 |
| 6,895,457 B2 * | 5/2005 | Wolrich et al. | 710/100 |
| 6,898,721 B2 | 5/2005 | Schmidt | 713/322 |
| 6,912,602 B2 * | 6/2005 | Sano et al. | 710/22 |
| 6,928,065 B2 | 8/2005 | Logalbo et al. | 370/337 |
| 6,981,074 B2 | 12/2005 | Oner | 710/32 |
| 2001/0015676 A1 | 8/2001 | Takikawa | 330/307 |
| 2001/0045914 A1 | 11/2001 | Bunker | 343/895 |
| 2001/0053135 A1 | 12/2001 | Carpelan | 370/329 |

* cited by examiner

| ORIG | DEST | DATA PACKET | | FREQ |
|---|---|---|---|---|
| A | C | 0X1000 | 0XFEB340A | F1 |
| A | C | 0X0004 | 0X35ACD01 | F1 |
| A | C | 0X0008 | 0XAEB249B | F1 |
| A | C | 0X000A | 0XF0956DB | F1 |

| ORIG | DEST | DATA PACKET | | FREQ |
|---|---|---|---|---|
| E | A | 0X1000 | 0XFEB340A | F1 |
| E | B | 0X4120 | 0X35ACD01 | F2 |
| E | C | 0X1CF0 | 0XAEB249B | F3 |
| E | D | 0X2B2C | 0XF0956DB | F4 |

| ORIG | DEST | DATA PACKET | | FREQ |
|------|------|-------------|--|------|
| E | A | 0X1000 | 0XFEB340A | F1 |
| E | B | 0X4120 | 0X35ACD01 | F1 |
| E | C | 0X1CF0 | 0XAEB249B | F1 |
| E | D | 0X2B2C | 0XF0956DB | F1 |

| ORIG | DEST | DATA PACKET | | FREQ |
|------|------|-------------|--|------|
| A | C | 0X1000 | 0XFEB340A | F1 |
| B | C | 0X0004 | 0X35ACD01 | F2 |
| D | C | 0X0008 | 0XAEB249B | F3 |
| F | C | 0X000A | 0XF0956DB | F4 |

WIRELESS COMMUNICATION SYSTEM WITHIN A SYSTEM ON A CHIP

RELATED APPLICATION DATA

This application is a continuation of U.S. patent application Ser. No. 10/249,568, filed Apr. 19, 2003, and titled "Wireless Communication System Within a System on a Chip," that is incorporated by reference herein in its entirety.

FIELD OF THE INVENTION

The present invention relates to communication within a chip, and in particular to a wireless communication system within a system on a chip (SOC).

BACKGROUND

As technology advances, there is an increased desire to fit increasingly complex circuitry within increasingly smaller devices. As a result, the number of cores that comprise an SOC has steadily increased over time. Currently, cores are physically wired together on a silicon chip to facilitate communication between the various functions such as processors, memory, I/O, etc. With the increasing number of cores, it has become more difficult to manage the congestion of wires associated with communication between the cores on a chip. As a result, the amount of space consumed by physical wires may limit the number of cores that may be included on a chip.

In an effort to reduce the amount of space consumed by wiring between cores, some wires are bundled together to form buses for more efficient communication. However, a bus is limited by its bandwidth and architecture. Many times only one core can communicate on the bus at any given time. Although there may be more advanced architectures that allow more than one core to communicate via the bus at a time, the physical wires connecting cores are still required. Thus, the number of cores that may be included on a chip may still be limited even where advanced architectures are utilized.

SUMMARY OF THE DISCLOSURE

One aspect of the present invention is a communication system for transmitting data between cores in an integrated circuit. The communication system includes an integrated circuit containing a plurality of cores, transmitter circuitry in the integrated circuit for wirelessly transmitting data between the cores, and receiver circuitry in the integrated circuit for wirelessly receiving the transmission of data.

Another aspect of the present invention is an integrated circuit containing a package of integrated components defining a system on a chip. The package of integrated components includes a plurality of cores defining a plurality of integrated subsystems within the system on a chip and communication means for wirelessly exchanging data between the plurality of integrated subsystems.

Still another aspect of the present invention is a method of wirelessly transmitting data between cores in an integrated circuit. The method includes the steps of providing an integrated circuit containing a plurality of cores, wirelessly transmitting data between the plurality of cores, and wirelessly receiving the data.

Other features, utilities and advantages of various embodiments of the invention will be apparent from the following more particular description of embodiments of the invention as illustrated in the accompanying drawings.

BRIEF DESCRIPTION OF THE DRAWINGS

For the purpose of illustrating the invention, the drawings show a form of the invention that is presently preferred. However, it should be understood that the present invention is not limited to the precise arrangements and instrumentalities shown in the drawings, wherein:

FIGS. 5A-8B are diagrams of various frequency configurations according to embodiments of the present invention;

DETAILED DESCRIPTION

The present invention is a wireless communication system within a SOC. By including wireless technology, the physical communication wiring between cores may be reduced. Conventional wireless technology is adapted for use in the SOC environment. The term "cores" is generally known in the art as another name for each of the subsystems that define the SOC. In addition, each of the cores or subsystems may include intellectual property (IP) cores, any bundled portion of a chip, any structured block of logic or data, or a defined region of a chip. The following provides a detailed description of drawings illustrating various embodiments of the present invention. Like elements include like element numbers.

Figure 1:
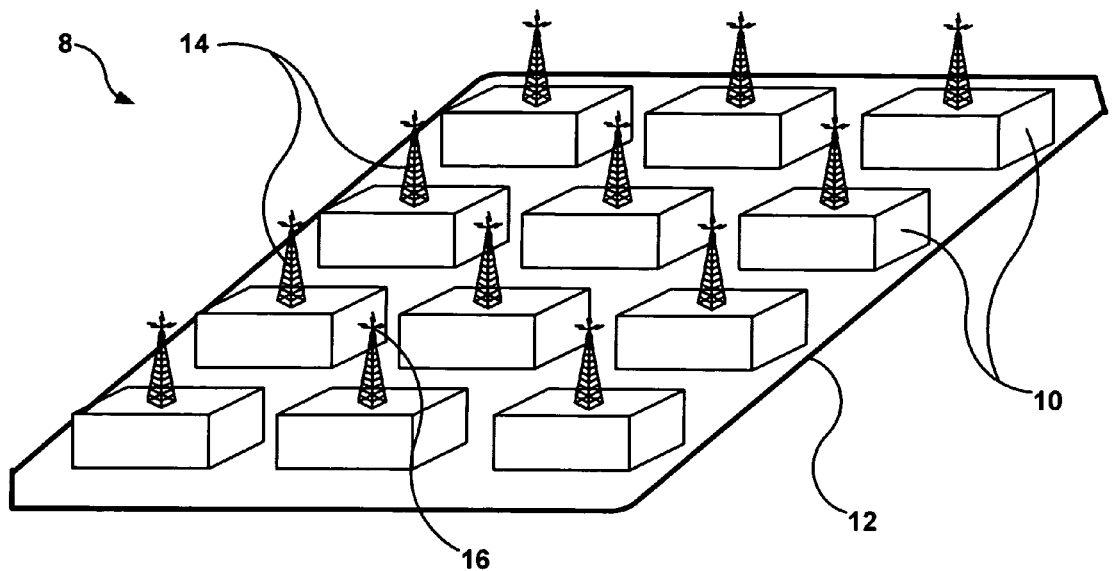
FIG. 1 is a block diagram of an architecture according to one embodiment of the present invention.

FIG. 1 illustrates one embodiment of a wireless communication system 8 within a system on a chip (SOC). A plurality of cores 10 are included in a single integrated circuit (not shown) on a silicon chip 12. In the embodiment illustrated in FIG. 1, the architecture of wireless communication system 8 is such that each core 10 includes its own antenna 14, transmitter circuitry (not shown), and receiver circuitry (not shown) for both wirelessly transmitting and receiving data signals 16. In such a configuration, each core 10 transmits and receives data signals independent of the other cores.

Figure 2:
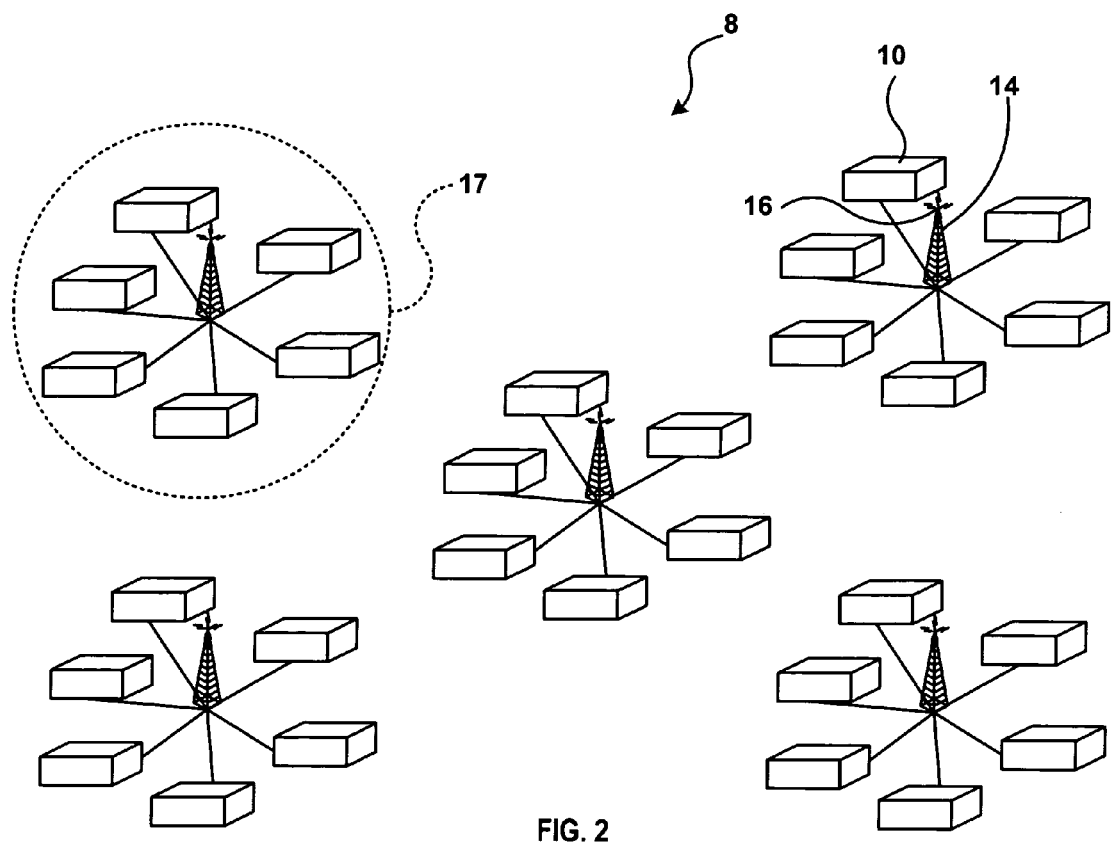
FIG. 2 is a block diagram of an architecture according to one embodiment of the present invention.

Alternative wireless communication system 8 having an alternative architecture is illustrated in FIG. 2. The architecture illustrated in FIG. 2 involves forming groups of cores 17 (five groups of cores 17 with six cores 10 each in FIG. 2 as indicated by dashed lines) to be serviced by a single antenna 14 and/or a single pair of transmitter/receiver circuitry (not shown).

Such an architecture may operate similar to a telephone switching system where several cores are tied into a transmitter/receiver station via wires. The stations then transmit and receive signals for their local group of cores 17. Such a configuration may reduce the number of antennas 14 and transmitters/receivers on a chip.

Figure 3:
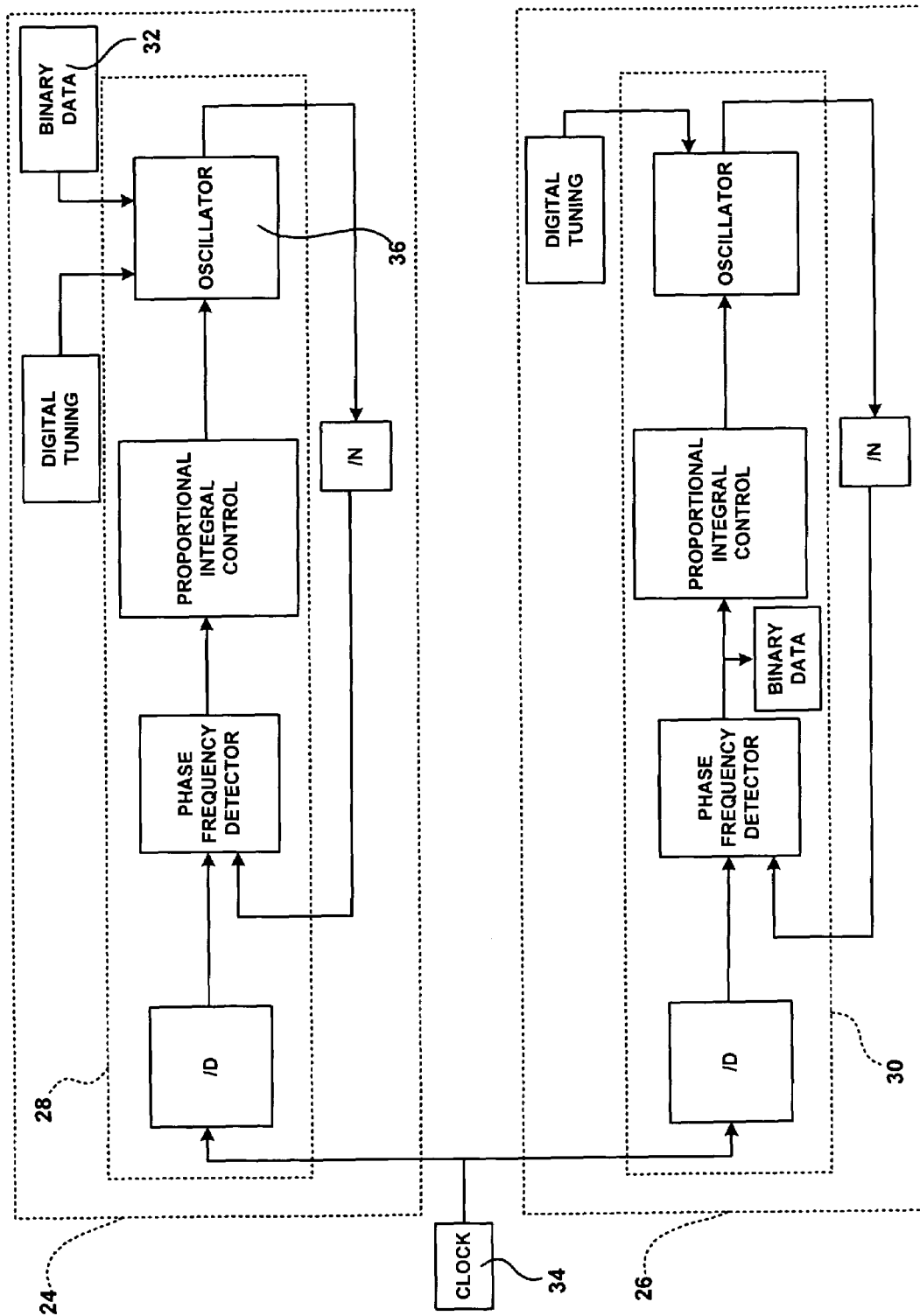
FIG. 3 is a block diagram of a typical voltage-controlled oscillator according to one embodiment of the present invention.
Figure 4:
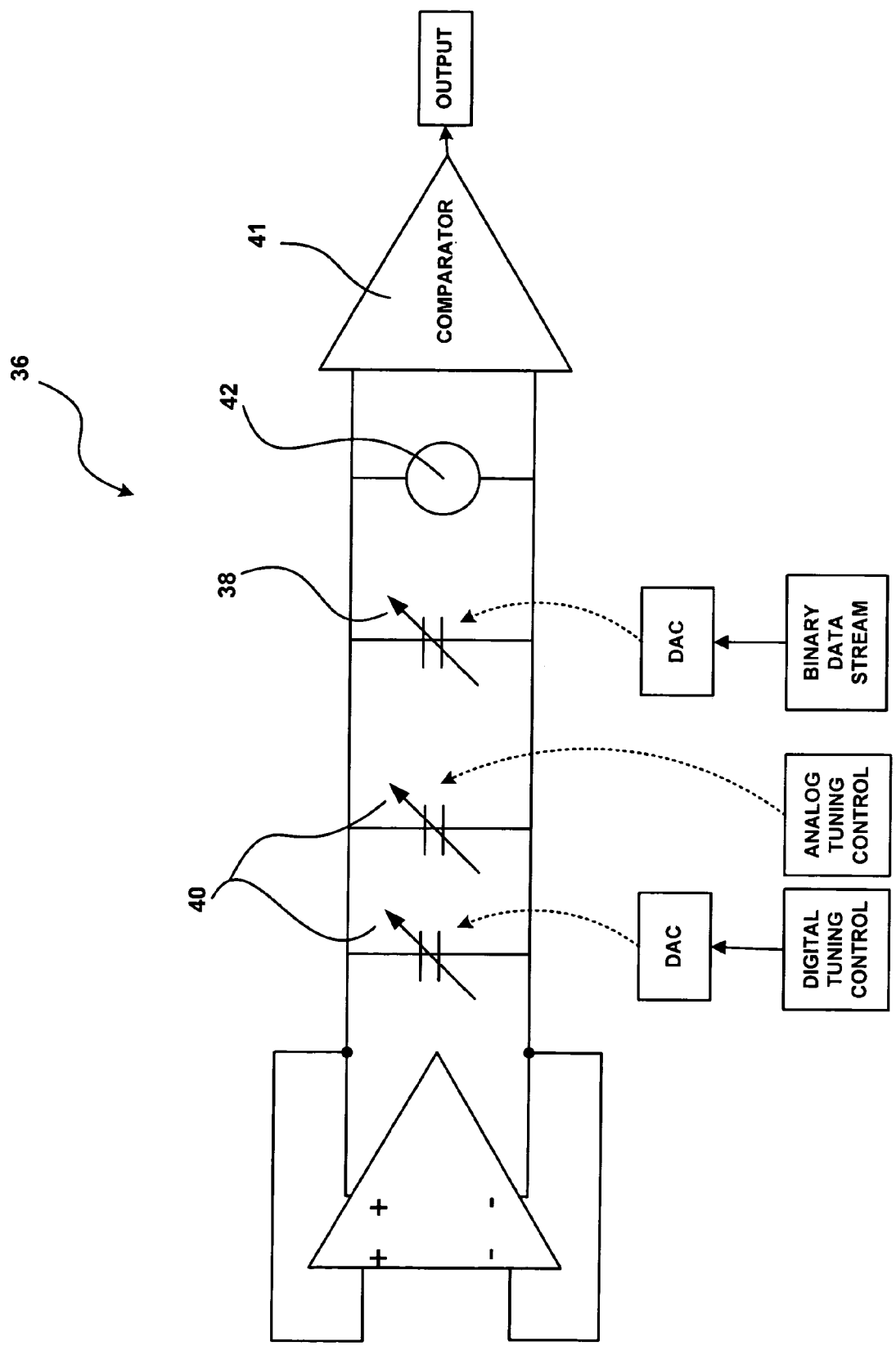
FIG. 4 is a flow diagram of the phase-locked loop circuits in one embodiment of the present invention.

FIGS. 3 and 4 illustrate typical transmitter and receiver circuitry used in the present invention. Referring to FIG. 3, for each of the system architectures described above, one or more cores 10 within each system may include one transmitter circuitry 24 and receiving circuitry 26. Both transmitter circuitry 24 and receiver circuitry 26 may include a phase-locked loop (PLL) 28 and 30, respectively. A data signal consisting of a binary data stream is provided by data stream source 32, synchronous with a clock signal provided by reference clock 34, is input to the digital port (not shown) of transmitter circuitry 24 (i.e., the binary data port of a voltage-controlled oscillator (VCO) 36). Reference clock 34 may be hardwired to each core in a system or a clock signal may be transmitted to each core over a certain frequency. Data stream source 32 modulates the capacitance of a varactor 38 (see FIG. 4), which modulates the frequency of VCO 36. For example, data stream source 32 may modulate the frequency of VCO 36 to produce a frequency shifted keying (FSK) encoded signal (not shown). Other forms of modulation may be employed without deviating from the scope and spirit of the invention.

In at least one embodiment, a single reference clock 34 is hardwired to both transmitter circuitry 24 and receiver circuitry 26. The use of a single reference clock 34 ensures that the phase reference is common to both transmitter circuitry 24 and receiver circuitry 26.

The frequency of receiver circuitry 26 is thus modulated by data stream source 32 of transmitter circuitry 24. Both the transmit and receive PLLs 28 and 30, respectively, are locked to the carrier frequency and the modulation of that carrier frequency contains the data.

Referring to FIG. 4, each of PLLs 28 and 30 typically comprise voltage-controlled oscillator (VCO) 36. VCO 36 includes a modulating varactor 38 and a tuning varactor 40. Varactors 38 and 40 are typically semiconductor diodes. Of course, in other embodiments, the particular components of both PLLs 28 and 30 and VCO 36 may vary. Initially, VCO 36 is tuned to a frequency close to the desired receiving or transmitting frequency. VCO 36 includes a phase comparator circuit 41 that seeks and locks onto the desired frequency, based on the output of a crystal-controlled reference oscillator (not shown). This works by operation of a feedback scheme. If the frequency of VCO 36 departs from the selected crystal reference frequency, phase comparator circuit 41 produces an error signal (not shown) that is applied to modulating varactor 38, bringing VCO 36 back to the reference frequency.

In addition to setting the frequency of VCO 36, an inductor 42 may serve as both a transmitting antenna and a receiving antenna. In one embodiment, inductor 42 is a fractal pattern antenna that is approximately one-half the wavelength of the frequency being transmitted (i.e., 0.5 centimeters per antenna).

FIGS. 3 and 4 describe one circuitry design for providing a receiver and transmitter in an embodiment of the present invention. As one skilled in the art will appreciate, there are myriad alternate circuitry designs for providing a receiver and transmitter to be used in the present invention. All alternative designs are encompassed by the system of the present invention.

Another aspect of the present invention is the particular frequency configuration used in transmitter circuitry 24 and receiver circuitry 26. In one embodiment of the present invention, when receiving signals, receiver circuitry 26 of each core 10 or group of cores 17 may have its own identifying frequency thereby allowing any other core or group of cores to send information to that core or group of cores on its particular frequency. Alternatively, each core 10 or group of cores 17 may be able to receive many different frequencies. In such a configuration, each core 10 or group of cores 17 will have the ability to decode a tag included with the transmission to determine if the transmission was meant for it or some other core or group of cores.

On the transmission side, transmitter circuitry 24 allows the frequency at which each core 10 or group of cores 17 is broadcasting to be changed in order to target a specific core or group of cores. In at least one embodiment, if it is desired that a core 10 or group of cores 17 send data to multiple cores or multiple groups of cores, the core or group of cores must transmit simultaneously at a variety of frequencies or transmit each packet of data serially at each respective frequency.

In an embodiment where each core 10 or group of cores 17 has its own frequency, each core or group of cores may have a special set of registers that contain the transmitting frequency for each of the other cores or groups of cores on the die. This would allow a transmitting core 10 or group of cores 17 to transmit to every core or group of cores at its receiving frequency.

In an alternative embodiment, transmitter circuitry 24 of core 10 or group of cores 17 may transmit data at one frequency and include the specific identification tag(s) of the cores or groups of cores with which it wishes to communicate in the data. Correspondingly, receiver circuitry 26 of core 10 or group of cores 17 is configured to decode the identification tag in the received data to determine if the transmission was meant for it or another core or group of cores. In addition, receiver circuitry 26 would also detect when data was transmitted to core 10 or group of cores 17 and decode the data after determining the data was meant for it.

In one embodiment, when all cores 10 or groups of cores 17 are on a single frequency, the protocol used may be collisions detect with multiple access (CDMA). With CDMA, transmitter circuitry 24 of each core 10 or group of cores 17 senses whether a receiving core/group is idle and available to receive a transmission. If available, transmitter circuitry 24 of core 10 or group of cores 17 transmits to the receiving core/group. If two cores 10 or groups of cores 17 transmit to the same receiving core/group at the same time, a collision is said to occur and the transmissions are discarded. Transmitter circuitry 24 of each of cores 10 or groups of cores 17 then waits a random or selected amount of time and re-transmits. This process is repeated until a successful transmission is sent.

As mentioned above, in an embodiment where all cores 10 or groups of cores 17 share a single frequency, specific cores/groups may be addressed using an identification tag or header packet on the frequency transmission. In addition, each core 10 may include a register containing its own identification tag so that it can compare its identification tag with the incoming transmission identification tag to make sure the message is intended for it and not another core. The identification tag of core 10 typically will either be hardwired into a register or dynamically set at power-up.

Although a single frequency embodiment simplifies the hardware required and makes multicasting easier and less expensive, it does not allow simultaneous communication between separate sets of cores 10.

FIGS. 5A-8D illustrate various frequency configurations of the wireless communications system of the present invention. Although the illustrations in FIGS. 5A-8D provide examples where cores are not grouped, as one skilled in the art will appreciate, the configurations described herein equally apply to grouped cores and are considered a part of the present invention.

Figures 5A, 5B:
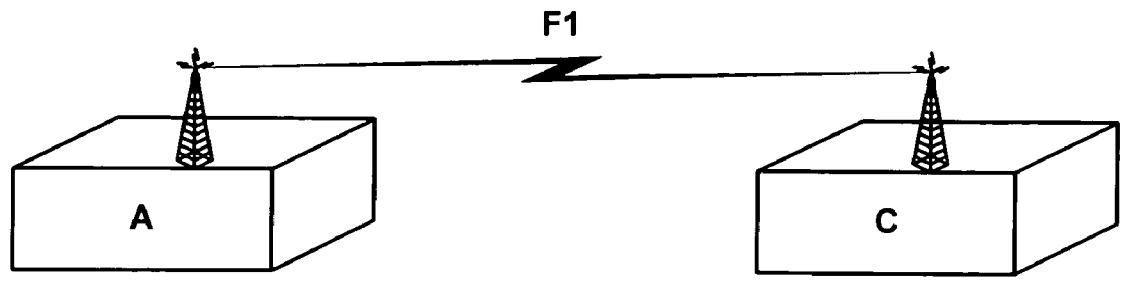

FIGS. 5A and 5B illustrate a frequency configuration where multiple transmits are sent from a single transmitter at core A to a single receiver at core C using a single frequency F1. As indicated by the table in FIG. 5B, in this embodiment, the address of the receiver core varies with each transmission. However, in other embodiments, the address of the receiver core may remain the same for subsequent transmissions. FIG. 5B is a table that delineated the transmitting core ("ORIG"), the receiving core ("DEST"), identification at each core and the corresponding data transmitted ("DATA PACKET"), and the frequency of the transmission ("FREQ"). Regarding the data packet, in FIGS. 5A-8D, the first six characters are the core identification and the remaining nine characters include the data. A similar table is provided for the alternative frequency configurations described below (i.e., FIGS. 6B, 6D, 7B, 8B).

In the case where a single transmission from a single core is transmitted to multiple receivers, the frequency configuration is typically arranged in one of two ways: 1) the transmitter simultaneously broadcasts the data to cores having different frequencies; or 2) the transmitter sends data at the same frequency but includes destination core identification in data packets including the data.

Figures 6A, 6B:
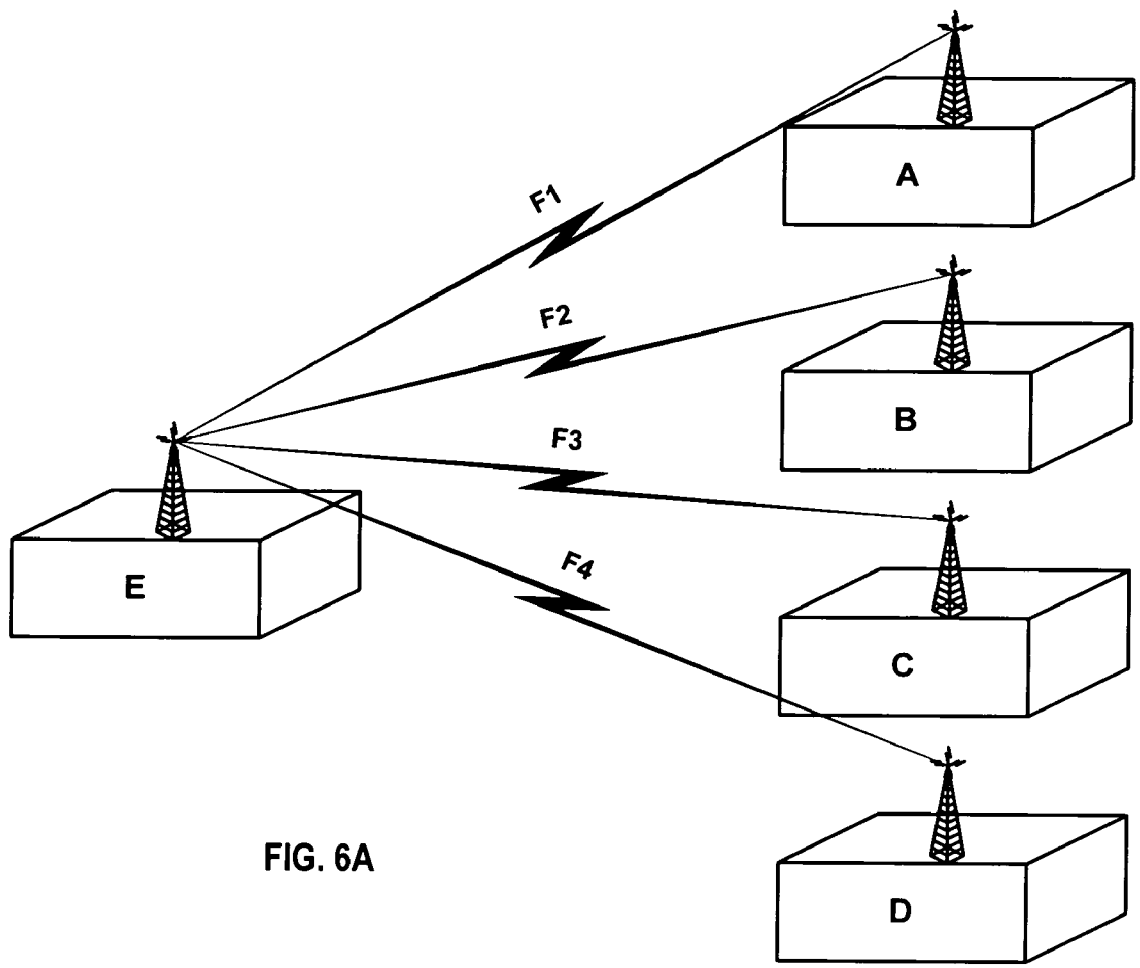
Figures 6C, 6D:
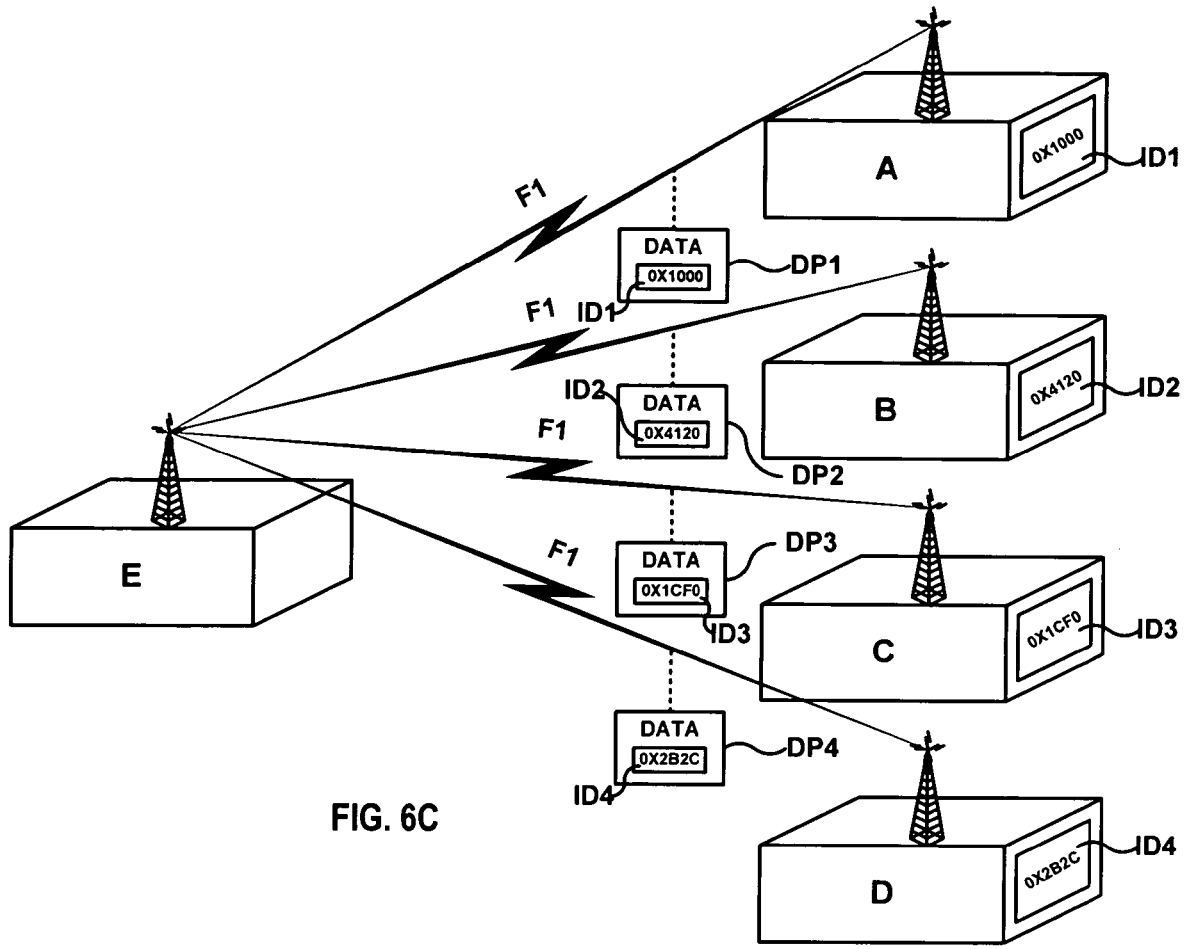

FIGS. 6A and 6B represent the former configuration, i.e., transmitter circuitry 24 simultaneously broadcasts the data to cores having different frequencies. FIGS. 6C and 6D represent the latter configuration, i.e., transmitter circuitry 24 sends data at the same frequency but includes destination core identifications ID1, ID2, ID3, and ID4 in data packets DP1, DP2, DP3, and DP4 with the data.

In FIGS. 6A and 6B, a single transmitter circuit 34 at core E transmits to multiple receiver circuits 36 at cores A, B, C, and D. In addition, the transmission is broadcast over multiple frequencies, i.e., frequencies F1, F2, F3, and F4.

Similarly in FIGS. 6C and 6D, a single transmitter circuit 34 at core E transmits to multiple receiver circuits 36 at cores A, B, C, and D. However, the transmission is broadcast over a single frequency F1. As explained above, the transmissions are directed to specific cores by including destination core identifications ID1, ID2, ID3, and ID4 in data packets DP1, DP2, DP3, and DP4 with the data.

Figures 7A, 7B:
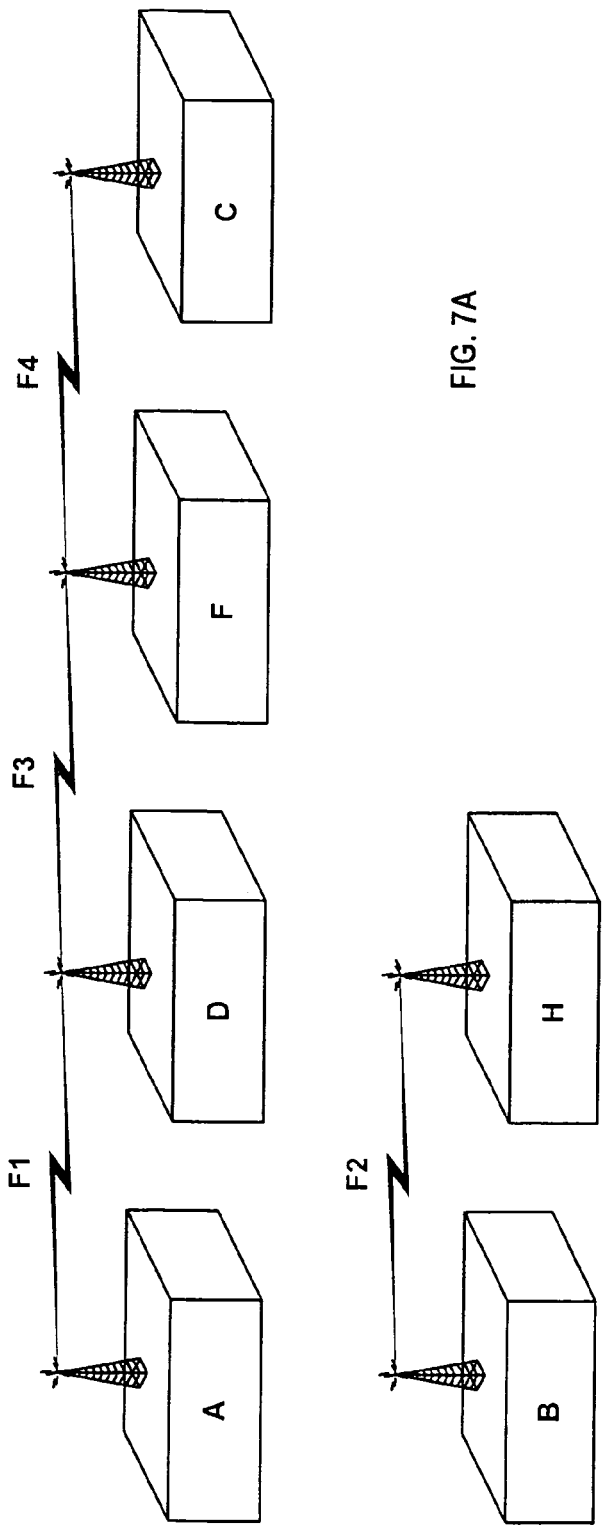

In FIGS. 7A and 7B, yet another frequency configuration is illustrated. A single transmission is broadcast from multiple transmitter circuits 34 at cores A, B, D, and F to multiple receiver circuits 36 at cores D, H, F, and C, respectively, on multiple frequencies F1, F2, F3, and F4, again respectively.

Figures 8A, 8B:
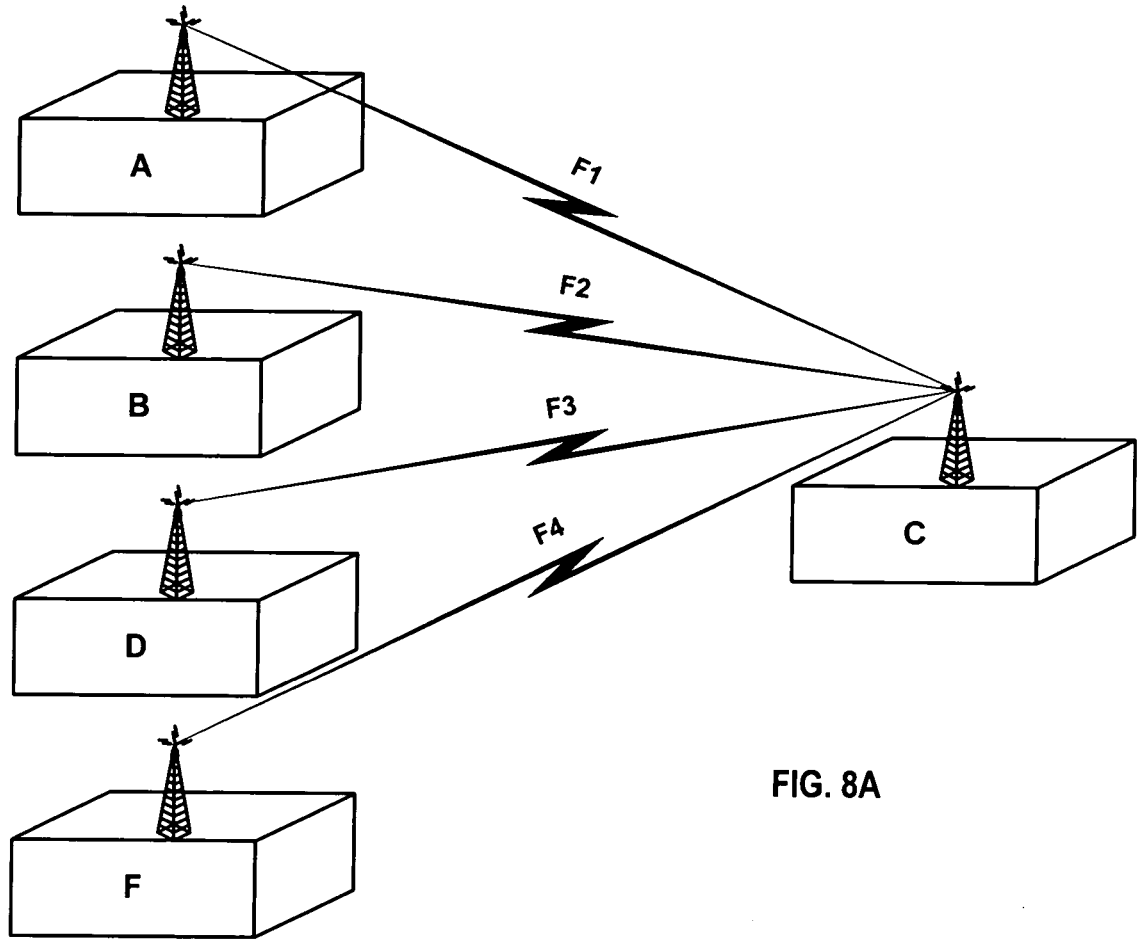

Still another frequency configuration is illustrated in FIGS. 8A and 8B. Multiple transmissions are broadcast from multiple transmitters at cores A, B, D, and F to a single receiver at core C. In order to keep all of the data separate and clean and ensure the receiver can properly receive each packet of data, each transmission is typically sent on a different frequency, i.e., F1, F2, F3, and F4.

Figure 9:
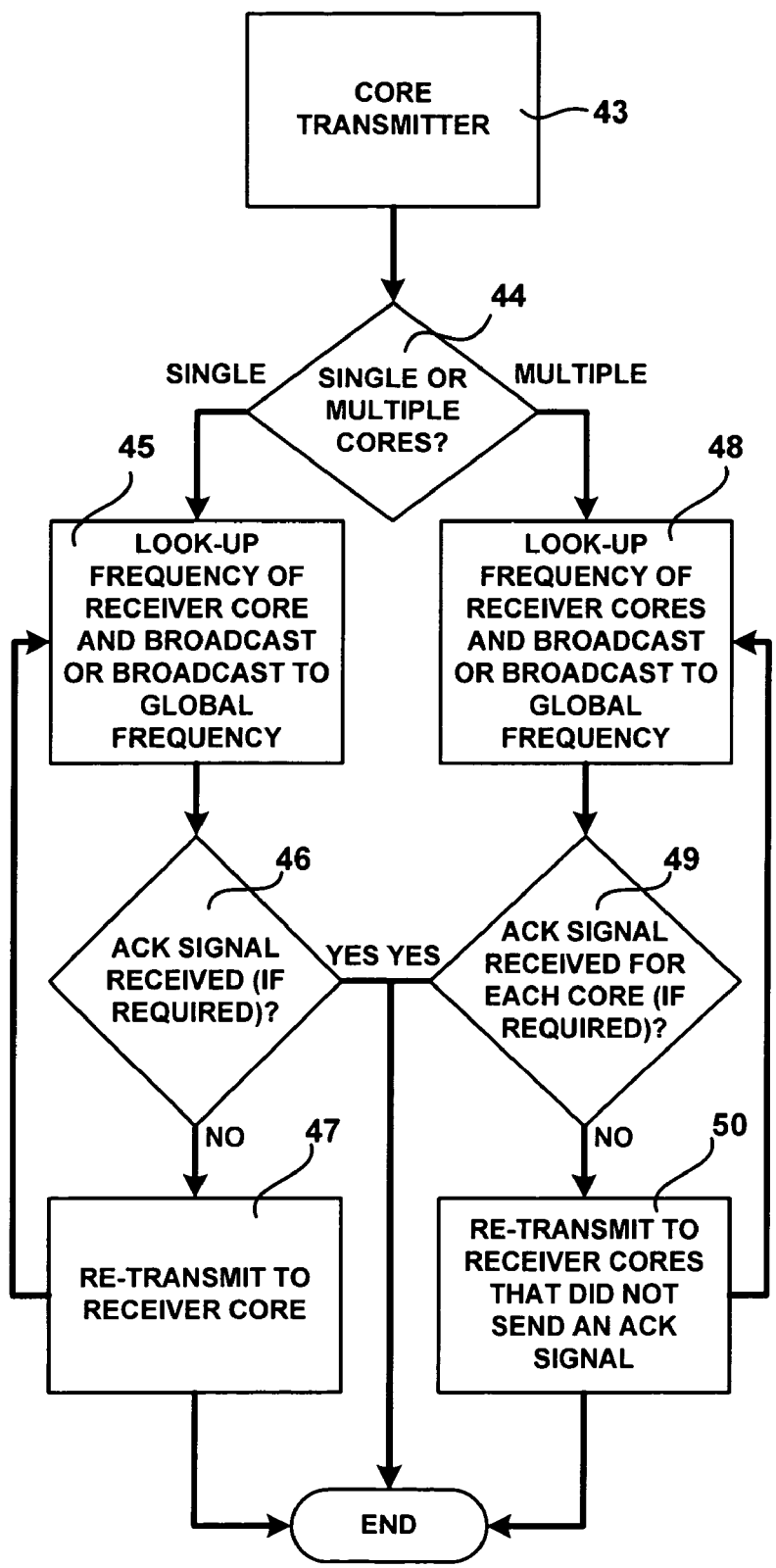
FIG. 9 is a flow diagram of a transmission procedure according to one embodiment of the present invention.
Figure 10:
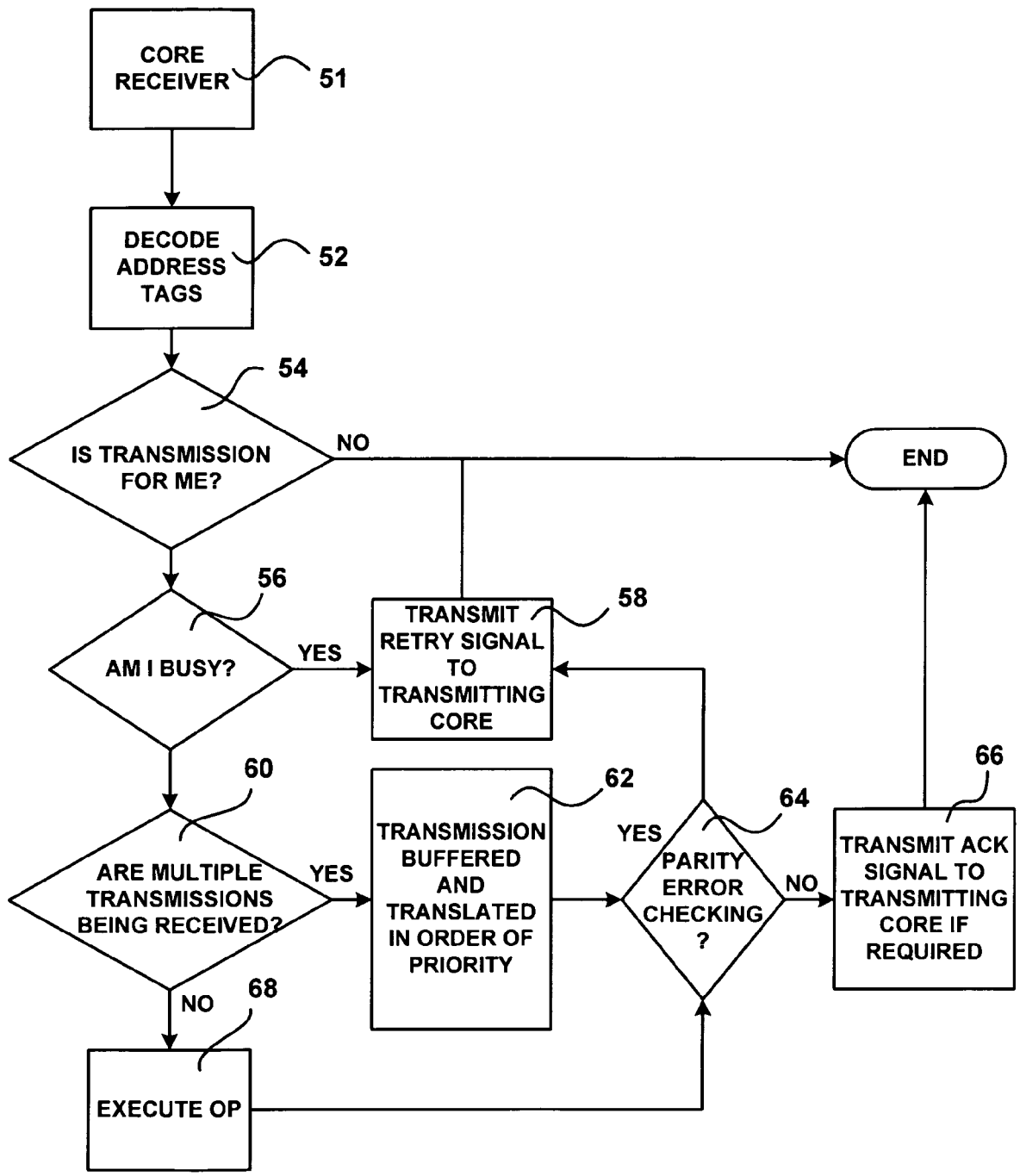
FIG. 10 is a flow diagram of a receiver procedure according to one embodiment of the present invention.

In the embodiments of the wireless communication system 8 described herein, certain procedures are carried out during transmission and receiver operations. FIGS. 9 and 10 are flow diagrams of the transmission and receiver procedures, respectively, for various architectures.

In FIG. 9, a transmission is initiated by transmitter circuitry 24 of core 10 at step 43. Next, at step 44, it is determined whether the transmission is to be broadcast to a single core 10 or multiple cores 17. If the transmission is to be broadcast to a single core 10, the procedure continues at step 45 where the frequency of the receiver circuitry 26 of the core is determined and the transmission is broadcast at that frequency or the transmission is broadcast at a global frequency. Then, at step 46, it is determined whether the transmission was properly received by confirming receipt of an "ACK" signal from receiver circuitry 26. Confirmation of receipt is typically called "handshaking." Receiver circuitry 26 sends a signal back to transmitter circuitry 24 indicating whether or not the transmission was successful. If receiver circuitry 26 is unable to accept transmitted data at the time of transmission or if there was an error in the transmission, receiver circuitry 26 may send a "retry" signal to transmitter circuitry 24. Conversely, if the transmission was successful, receiver circuitry 26 should send an ACK signal. At step 47, if no ACK signal was received or a retry signal was received from receiver circuitry 26 of the receiving core, the procedure loops back to step 46 and the transmission is re-broadcast to the core. If an ACK signal was received from receiver circuitry 26 of the receiving core, the procedure ends. The use of handshaking or returning an ACK signal may not be utilized in every embodiment. For example, such practice may be omitted where a broadcast transmission is made to a large number of cores.

If the transmission is to be broadcast to multiple cores, the procedure continues at step 48 (from step 44) where the frequency of each of the receiver cores is determined and the transmission is broadcast at those frequencies or the transmission is broadcast at a global frequency. Then, at step 49, it is determined whether the transmission was properly received by confirming receipt of an "ACK" signal from each receiver circuitry 26 of each receiving core. At step 50, for each core whose receiver circuitry 26 failed to return an ACK signal confirming receipt of the transmission or that sent a retry signal, the procedure loops back to step 48 and the transmission is re-broadcast to those cores. Once an ACK signal has been received from each receiver circuitry 26, the procedure ends.

Referring now to FIG. 10 and the receiver procedure, the receiving procedure is initiated by receiver circuitry 26 at step 51. First, at step 52, the identification tags of the incoming transmission are decoded. Then, at step 54, the decoded tag is compared to the address of the receiver circuitry's to determine whether the transmission was intended for that particular core. If the decoded tag and identification of the receiver circuitry's core do not match, it is determined that the transmission was not intended for that particular core and the receiver procedure ends. However, if the receiver circuitry's core identification and the decoded tag do match, then the procedure continues at step 56. At step 56, it is determined whether the receiver circuitry of the core is busy receiving a transmission from another core at the time of the incoming transmission. If it is busy, the procedure continues at step 58 where a retry signal is transmitted to the transmitter circuitry of the transmitting core (discussed above with respect to FIG. 8). After the retry signal is transmitted, the receiver procedure ends. If it is not busy, at step 60 it is determined whether multiple transmissions are being received. Although a core's receiver circuitry 26 may not be able to receive multiple transmissions simultaneously, typically each core will be able to receive and transmit signals at the same time.

The receiving procedure continues at step 62 where if multiple transmissions are being received by the receiver circuitry 26, the transmissions are buffered and translated with the highest priority transmission being translated first. Coding included in the data packet may indicate the priority of a particular transmission. Alternatively, transmissions may be translated in the order they are received. Next, at step 64, parity error checking is performed. Typically, parity error checking data is transmitted with each data packet transmitted. The parity error checking data is reviewed for errors to determine if the transmission was successful. Cycle redundancy checking (CRC) may be used to confirm proper receipt of transmissions instead of parity error checking. If a parity error exists, the procedure loops back to step 58 where a retry signal is transmitted to transmitter circuitry 24. After the retry signal is transmitted, the receiver procedure ends. Accordingly, the transmissions will be re-transmitted upon receipt of a retry signal by the receiving core. If no parity error is detected, the procedure continues at step 66 where an ACK signal is transmitted to transmitter circuitry 24 indicating that the transmission was successful. After the ACK signal is transmitted, the receiver procedure ends.

If it is determined that only a single message is being transmitted (at step 60), the procedure continues at step 68 where the transmission is translated. Then, at step 64, parity error checking of the translated transmission is performed. If a parity error exists, the procedure loops back to step 58 where a retry signal is transmitted to transmitter circuitry 24. After the retry signal is transmitted, the receiving procedure ends. Accordingly, the transmission will be re-transmitted upon receipt of a retry signal by transmitter circuitry 24. If no parity error is detected, the procedure continues at step 66 where an ACK signal is transmitted to transmitter circuitry 24 indicating that the transmission was successful. After the ACK signal is transmitted, the receiving procedure ends.

In other embodiments of the present invention, additional hardware such as filters, amplifiers, and mixers may be utilized in both transmitter circuitry 24 and receiver circuitry 26. Also, some form of power is typically required to drive the transmitter/receiver circuitry 34, 36. It is generally desirable to limit the amount of power provided to the amount of power required to transmit a signal from one corner of a chip to the farthest diagonally-opposite corner (i.e., the longest possible communications distance on the chip). Using more power would be wasteful and may cause cross-talk interference with other components on the chip. Additionally, due to Federal Communications Commission regulations, signals must not be broadcast outside the chip. In some instances, some type of shielding may also be required to alleviate cross-talk and prevent signals from leaving the chip.

In one alternative embodiment of the present invention, each core includes a back-up communication system that will allow them to communicate in the event their primary communication system fails. A back-up system may utilize wireless technology or may include some form of physical wiring.

In various alternative embodiments of the present invention, data may be wirelessly transmitted and received using various wireless technologies such as infrared (IR), radio frequency (RF), or some other wireless medium.

A wireless communication system within an SOC offers multiple benefits and addresses at least some of the difficulties not addressed in prior art chip designs. The present invention both eliminates wiring congestion problems on a chip and increases the speed at which communication can transpire within an SOC. In addition, in embodiments that allow many cores to transmit at the same time over different frequencies, the overall communications bandwidth of the SOC is broadened directly proportionally to the number of frequencies that are utilized.

While the present invention has been described in connection with specified embodiments, it will be understood that it is not so limited. On the contrary, it is intended to cover all alternatives, modifications and equivalents as may be included within the spirit and scope of the invention as defined in the appended claims.

The invention claimed is:

1. A communication system for transmitting data between cores in an integrated circuit, the communication system comprising:
an integrated circuit containing a plurality of cores;
transmitter circuitry in said integrated circuit for wirelessly transmitting data between said cores; and
receiver circuitry in said integrated circuit for wirelessly receiving said wirelessly transmitted data.

2. A system according to claim 1, wherein each of said transmitter circuitry and receiver circuitry transmits and receives data, respectively, on a frequency that is unique with respect to each of said plurality of cores.

3. A system according to claim 1, wherein each of said transmitter circuitry and receiver circuitry transmits and receives data, respectively, on the same frequency.

4. A system according to claim 1, wherein said transmitter and receiver circuitry are shared by groups of cores.

5. A system according to claim 1, wherein at least one of said transmitter circuitry and said receiver circuitry further comprises a phase-locked loop circuit having a voltage-controlled oscillator.

6. A system according to claim 1, further comprising a reference clock, wherein said transmitter circuitry and said receiver circuitry are in communication with said reference clock.

7. A system according to claim 1, wherein said receiver circuitry is able to transmit busy signals to said transmitter circuitry when said receiver circuitry is busy receiving another transmission at the time said transmitter circuitry transmits data.

8. A system according to claim 1, wherein said transmitter circuitry is able to transmit data at the same time said receiver circuitry receives data.

9. A system according to claim 1, wherein transmitter circuitry in a single core from said plurality of cores transmits to receiver circuitry in at least two other cores from said plurality of cores.

10. A system according to claim 9, wherein said transmitter circuitry is able to transmit data at the same time said receiver circuitry receives data.

11. A system according to claim 1, wherein each of said plurality of cores has an identification.

12. A system according to claim 11, wherein said identification may be dynamically re-configurable.

13. A system according to claim 11, wherein an identification tag including said identification may be included in the data.

14. A system on a chip comprising:
an integrated circuit containing a package of integrated components defining a system on a chip,
a plurality of cores defining a plurality of integrated subsystems within said system on a chip, said plurality of cores included in said package of integrated components; and
communication means for wirelesly exchanging data between said plurality of integrated subsystems, said communication means included in said package of integrated components.

15. A system according to claim 14, wherein at least one of said transmitter circuitry and said receiver circuitry further comprises a phase-locked loop circuit having a voltage-controlled oscillator.

16. A method of wireles sly transmitting data between cores in an integrated circuit, the method comprising the steps of:

providing an integrated circuit containing a plurality of cores;

wirelessly transmitting data between said plurality of cores; and wirelessly receiving said data.

17. A method according to claim 16, further comprising the step of: transmitting and receiving data on the same frequency for each of said plurality of cores.

* * * * *